(12) United States Patent
Hu et al.

(10) Patent No.: US 10,907,263 B2
(45) Date of Patent: Feb. 2, 2021

(54) METHOD OF SYNTHESIS OF AN ELECTRODE FOR USE AS A CATALYST OF OXYGEN EVOLUTION REACTION

(71) Applicant: ECOLE POLYTECHNIQUE FEDERALE DE LAUSANNE (EPFL), Lausanne (CH)

(72) Inventors: Xile Hu, St-Prex (CH); Fang Song, Shanghai (CN); Elitsa Petkucheva, Pleven (BG)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/333,403

(22) PCT Filed: Sep. 14, 2017

(86) PCT No.: PCT/IB2017/055551
§ 371 (c)(1),
(2) Date: Mar. 14, 2019

(87) PCT Pub. No.: WO2018/051258
PCT Pub. Date: Mar. 22, 2018

(65) Prior Publication Data
US 2019/0256992 A1    Aug. 22, 2019

(30) Foreign Application Priority Data
Sep. 15, 2016 (EP) .................................... 16189000

(51) Int. Cl.
C25B 11/04      (2006.01)
C25B 1/04       (2006.01)
(Continued)

(52) U.S. Cl.
CPC ............ *C25B 11/0415* (2013.01); *C25B 1/04* (2013.01); *C25B 11/035* (2013.01); *C25B 11/04* (2013.01);
(Continued)

(58) Field of Classification Search
None
See application file for complete search history.

(56) References Cited

U.S. PATENT DOCUMENTS 10,519,555 B2 *  12/2019  Zhao ..................... C25D 5/40
10,724,145 B2 *   7/2020  Subbaraman ....... C25B 11/0478
(Continued)

FOREIGN PATENT DOCUMENTS

WO    2016/023065 A1    2/2016

OTHER PUBLICATIONS

Trotochaud et al "Nickel-Iron Oxyhydroxide Oxygen-Evolution Electrocatalysts: The Role of Intentional and Incidental Iron Incorporation" JACS, 2014, p. 6744-6753. (Year: 2014).*
(Continued)

*Primary Examiner* — Brian W Cohen
(74) *Attorney, Agent, or Firm* — Nixon & Vanderhye

(57) ABSTRACT

Disclosed are methods of synthesis of an oxidized nickel foam electrode incorporating iron including the step of subjecting a nickel foam electrode to repetitive cyclic voltammetric scans in a basic solution containing iron. Also disclosed is an oxidized nickel foam electrode the oxidized nickel foam incorporating iron, and use of such an electrode as a catalyst for oxygen evolution reaction. Also disclosed is a water splitting device such as an electrolyzer including such an electrode.

14 Claims, 5 Drawing Sheets

(51) Int. Cl.
*C25B 11/03* (2006.01)
*C25D 9/06* (2006.01)
*C25D 9/08* (2006.01)

(52) U.S. Cl.
CPC ............ *C25B 11/0478* (2013.01); *C25D 9/06* (2013.01); *C25D 9/08* (2013.01); *Y02E 60/36* (2013.01)

(56) References Cited

U.S. PATENT DOCUMENTS

| | | | | |
|---|---|---|---|---|
| 2007/0095657 | A1* | 5/2007 | Kim | H01G 11/46 204/290.12 |
| 2010/0021776 | A1* | 1/2010 | Dougherty | C25D 9/08 429/406 |
| 2013/0171442 | A1* | 7/2013 | Lin | C23C 18/1216 428/315.5 |

OTHER PUBLICATIONS

Enman et al "Effects of Intentionally Incorporated Metal Cations on the Oxygen Evolution Electrocatalytic Activity of Nickel (Oxy) hydroxide in Alkaline Media" ACS Catalysis, 2016, p. 2416-2423. (Year: 2016).*

International Search Report, dated Dec. 21, 2017, from corresponding PCT/IB2017/055551 application.

Han Guan-Qun et al: "Three dimensional nickel oxides/nickel structure by in situ electro-oxidation of nickel foam as robust electrocatalyst for oxygen evolution reaction", Applied Surface Science, vol. 359, Oct. 17, 2015 (Oct. 17, 2015), pp. 172-176, XP029339933, ISSN: 0169-4332, DOI: 10.1016/J.APSUSC.2015. 10.097.

Zhiyi Lu et al: "Three-dimensional NiFe layered double hydroxide film for high-efficiency oxygen evolution reaction—Electronic Supplementary Material", Chemical Communications—CHEMCOM., vol. 50, No. 49, Jan. 1, 2014 (Jan. 1, 2014), pp. 6479, XP055338020, ISSN: 1359-7345, DOI: 10.1039/c4cc01625d.

Zhiyi Lu et al: "Three-dimensional NiFe layered double hydroxide film for high-efficiency oxygen evolution reaction", Chemical Communication—CHEMCOM., vol. 50, No. 49, Jan. 1, 2014 (Jan. 1, 2014), pp. 6479, XP055338019, ISSN: 1359-7345, DOI: 10.1039/c4cc01625d.

* cited by examiner

METHOD OF SYNTHESIS OF AN ELECTRODE FOR USE AS A CATALYST OF OXYGEN EVOLUTION REACTION

The invention concerns new catalysts for oxygen evolution reaction, methods for obtaining them and applications thereof.

The water splitting reaction provides a convenient mechanism through which intermittent renewable energies are stored in the form of chemical fuels, namely hydrogen and oxygen. The bottleneck reaction in water splitting is the oxygen evolution reaction (OER, $2H_2O \rightarrow O_2+4H^++4e^-$). Numerous transition metal oxides have been explored as OER catalysts. Although in acidic solutions only precious iridium oxide ($IrO_x$), ruthenium oxide ($RuO_x$), and their composites have sustained OER activity, in alkaline solutions a number of non-precious metal oxides are reported to have higher activity than $IrO_x$. Nickel foam (NF) is widely used as a 3-dimensional support for OER catalysts in alkaline conditions.

The OER activity of the nickel foam is modest. The aim of the invention is to provide new efficient catalysts for OER and to propose procedures to activate nickel foam to achieve excellent catalytic activity starting from materials that are easily accessible, the activation procedure being simple and low cost.

According to a first embodiment, the present invention provides a method of synthesis of an oxidized nickel foam electrode incorporating iron comprising a step of subjecting a nickel foam electrode to repetitive cyclic voltammetric scans in a basic solution containing iron.

Advantageously, the repetitive cyclic voltammetric scans are performed from a first value "a" comprised between 1.15 and 1.25 V, for example around 1.209V, to a second value "b" comprised between 1.49 to 1.59V, for example around 1.539V, versus Reversible Hydrogen Electrode (RHE) at a scan rate comprised between 8 $mV \cdot s^{-1}$ and 12 $mV \cdot s^{-1}$, for example around 10 $mV \cdot s^{-1}$.

Advantageously, the basic solution used for repetitive cyclic voltammetric scans comprises at least 0.08 $mg \cdot L^{-1}$ of iron, for example 0.095 $mg \cdot L^{-1}$ or 0.18 $mg \cdot L^{-1}$. Preferably, said iron is in the form of Fe(II), Fe(III) or Fe(IV), more preferably in the form of Fe(III).

Preferably, said basic solution is a KOH solution or a NaOH solution. Both are preferably used at a concentration between 0.5 M and 10 M, for example at a concentration of around 1 M, 4.2 M or 8 M.

Advantageously, the repetitive cyclic voltammetric scans are carried out at least 30 times, preferably at least 50 times, even more preferably between 90 and 110 times, for example 100 times.

The repetitive cyclic voltammetric scans allow the oxidation of the surface of nickel foam and the incorporation of iron in the nickel foam leading to the formation of a layer of Fe-doped nickel oxide ($NiO_x$—Fe) on the surface of the electrode. Depending on the degree of oxidation, $NiO_x$ can be NiO, $Ni(OH)_2$ or NiOOH.

Surprisingly, such incorporation of iron in the nickel foam of the electrode lead to a much higher OER activity than that of a nickel foam electrode without incorporation of iron.

In the following description, such an electrode obtained by the method of synthesis according to the first embodiment of the invention is designated as a "NF $NiO_x$—Fe" electrode.

A method of synthesis of an oxidized nickel foam electrode incorporating iron according to a second embodiment of the invention differs from the method according to the first embodiment of the invention in that it comprises an additional step consisting in dipping said nickel foam electrode into an iron dipping solution preferably for at least 10 minutes, preferably between 10 minutes and 60 minutes, typically for 30 minutes, prior to said step of subjecting said nickel foam electrode to repetitive cyclic voltammetric scans in a basic solution containing iron, as defined in the first embodiment.

Advantageously, said iron dipping solution comprises Fe(II), preferably $FeCl_2$, and/or Fe(III), preferably $FeCl_3$, at a concentration between 0.005 M and 0.2 M, preferably between 0.01 M and 0.1 M.

This dipping additional step leads to Fe incorporation in the nickel foam electrode. In the following description, such an electrode obtained by the dipping additional step of the method according to the second embodiment of the invention is designated as a "NF Fe" electrode. This electrode still needs to be oxidized by repetitive cyclic voltammetric scans to be an efficient catalyst of oxygen evolution reaction.

The incorporation of iron resulting from the repetitive cyclic voltammetric scans in a basic solution containing iron after this additional step leads to an increase of the iron loading on the nickel foam electrode and to a more homogeneously incorporated iron.

Alternatively, the step of subjecting the nickel foam electrode to repetitive cyclic voltammetric scans according to the second embodiment of the invention can be made in a basic solution that does not necessarily contain iron. Indeed, in the second embodiment, a certain amount of iron is already incorporated in the electrode by the additional step of dipping the nickel foam electrode into an iron dipping solution. Said basic solution is typically a KOH solution or a NaOH solution, preferably used at a concentration between 0.5 M and 10 M, for example at a concentration of around 1 M, 4.2 M or 8 M In the following description, an electrode obtained by the method of synthesis according to the second embodiment of the invention is designated as a "NF Fe Ac" electrode, which stands for nickel foam activated (by repetitive cyclic voltammetric scans) electrode incorporating iron.

Methods of synthesis of an oxidized nickel foam electrode incorporating iron according to a third and a fourth embodiments of the invention respectively differ from the methods according to the first and second embodiments of the invention in that they start by a step consisting in the washing of said nickel foam electrode in an acid cleaning solution. Said acid cleaning solution preferably comprises HCl or $H_2SO_4$. Advantageously, this acid cleaning solution is a solution of HCl at a concentration of 5% to 10% or a solution of $H_2SO_4$ at a concentration of 2% to 5%.

In the following description, an electrode obtained by the method of synthesis according to the third embodiment of the invention is designated as a "NF AC $NiO_x$—Fe" electrode, AC standing for "Acid Cleaned".

In the following description, an electrode obtained by the method of synthesis according to the fourth embodiment of the invention is designated as a "NF AC Fe Ac".

Usually people use acid cleaning to get fresh metal surface via dissolving some of the old surface. In fact, acid cleaning is a general method to remove the surface nickel oxides formed by the air oxidation of nickel metal. In the context of the invention, it has surprisingly been shown that the acid cleaning step results in the formation of a rough surface. It has also been shown that such an acid cleaning step improve the activity of an oxidized nickel foam electrode incorporating iron. Inventors think that this may come from the formation of a rougher surface which allows the deposition of more iron oxide (FeO$_x$) on the electrode and/or by the removal of surface nickel oxide (NiO$_x$) on the electrode which may block the electrodeposition of FeO$_x$.

The present invention also provides an oxidized nickel foam electrode, said oxidized nickel foam incorporating iron, and, in particular, an electrode that can be obtained by the methods of synthesis according to the four previously mentioned embodiments of the invention.

Advantageously, the electrode according to the invention comprises at least 0.1 µg·cm$^{-2}$, preferably between 0.1 and 20 µg·cm$^{-2}$, preferably between 0.7 and 9.8 µg·cm$^{-2}$ of iron.

Moreover, the electrode according to the invention is preferably in the form of nickel foam having a coating layer comprising crystalline nanoparticules with a size between 1 and 20 nm, preferably between 3 and 10 nm, said nanoparticules typically including Ni, NiO and Fe$_2$O$_3$.

Moreover, the present invention concerns the use of such an electrode as a catalyst of oxygen evolution reaction.

Finally, the invention also provides a water splitting device such as an electrolyzer comprising an electrode according to the invention.

Regardless of the implemented embodiment of the invention, the used nickel foam can be obtained by carbonyl techniques, by chemical vapor deposition, electroplating, sputtering, directed vapor deposition, sintering or any other methods on polymer materials or other materials that have established pore structure and porosity.

The exposed surface area of nickel foam is important. The skilled person would prefer using a nickel foam with the smallest pore size, the lowest density, the greatest porosity and/or the largest thickness to obtain better catalytic activity. Advantageously, the thickness of the nickel foam electrode used in the context of the invention is more than 1 mm, it is for example about 1.6 mm, and the porosity of this electrode is more than 90%, it is for example about 95%.

Figure 5:
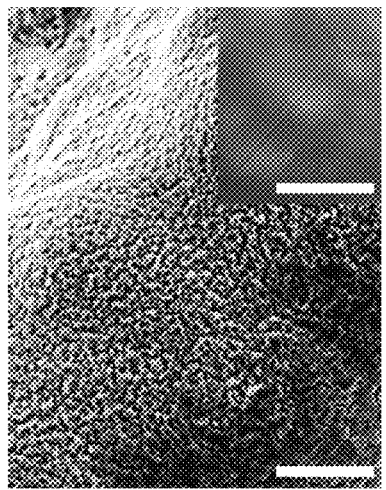
Figure 6:
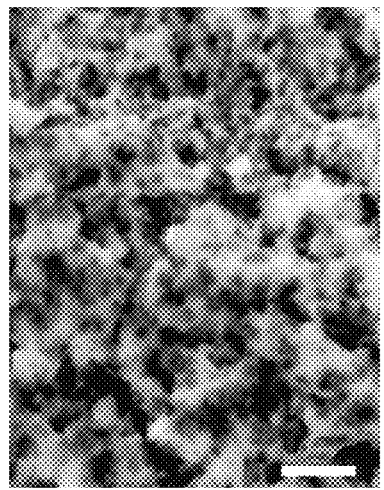

FIGS. 5 and 6 show SEM images of an NF-AC-Fe electrode. The inset in FIG. 5 shows the SEM image of an NF-AC electrode. Scale bars in FIG. 5, inset of FIG. 5 and FIG. 6 respectively correspond to 10 µm, 10 µm and 1 µm.

Figure 7:
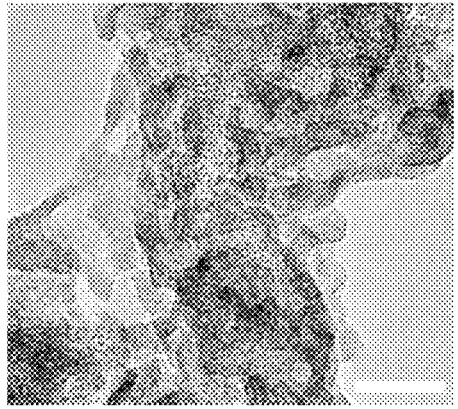
Figure 8:
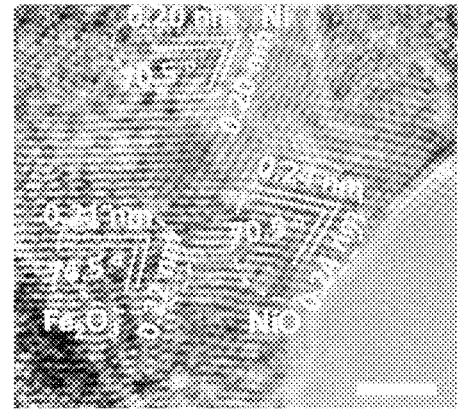

FIGS. 7 and 8 show transmission electron microscopy (TEM) images of NF-AC-Fe electrode. Scale bars in FIGS. 7 and 8 respectively correspond to 10 nm and 2 nm.

Figure 9:
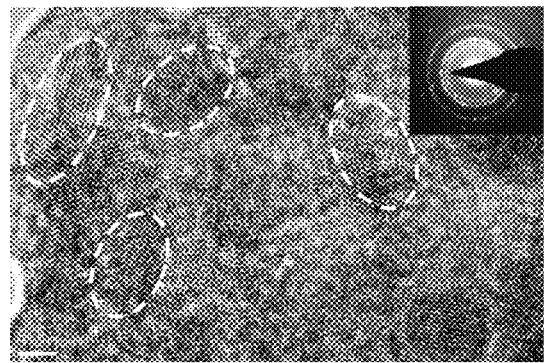

FIG. 9 is high resolution TEM (HRTEM) image of the NF-AC-Fe—Ac electrode. Scale bar in FIG. 9 corresponds to 2 nm.

Figure 10:
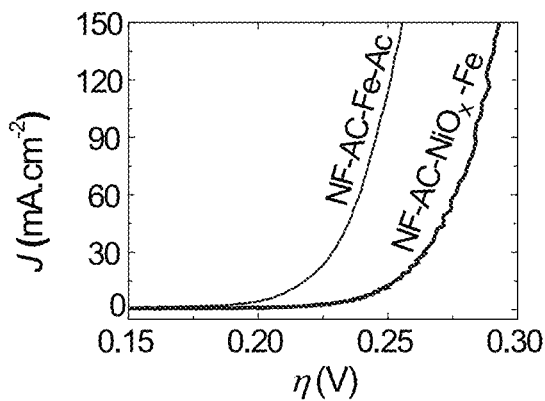
Figure 11:
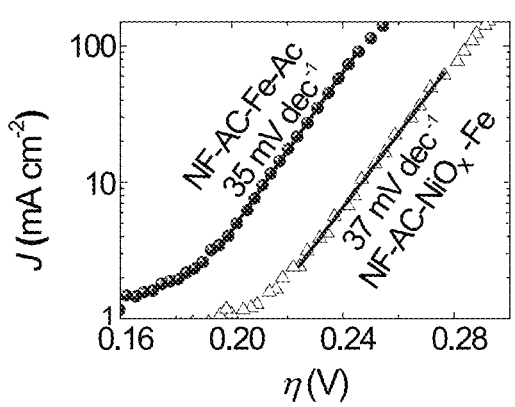

FIGS. 10 and 11 respectively show polarization curves and Tafel plots of NF-AC-Fe—Ac and NF-AC-NiO$_x$—Fe electrodes.

Figure 12:
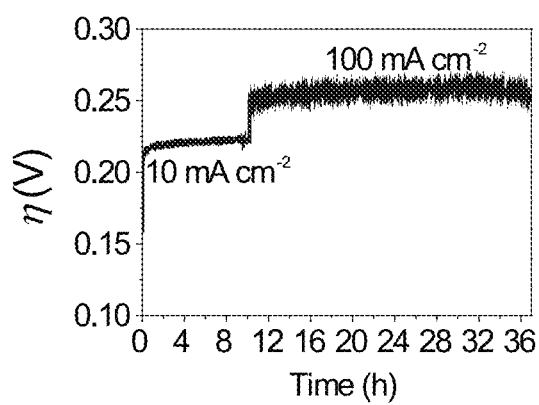

FIG. 12 shows chronopotentiometric measurements at 10 mA·cm$^{-2}$ for 10 hours and subsequently at 100 mA cm$^{-2}$ for 27 hours using activated NF-AC-Fe—Ac as catalyst of OER.

Figure 13:
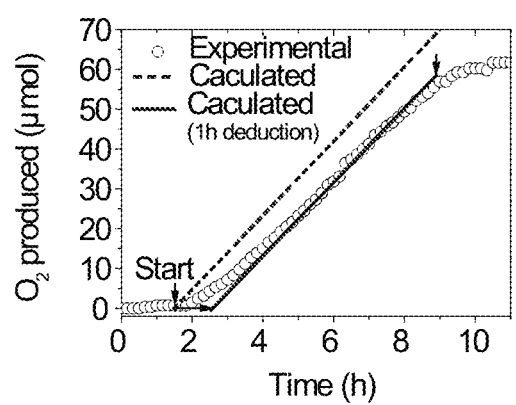

FIG. 13 compares calculated versus experimental oxygen production catalyzed by NF-AC-Fe—Ac at a constant oxidative current of 1 mA.

EXAMPLE 1: PREPARATION OF NF—NiO$_x$—Fe

The as-received nickel foam electrodes have been washed with acetone under sonication conditions at a frequency of 20 kHz for 15 minutes. These electrodes made of nickel foam (NF) have then been subjected to 100 repetitive cyclic voltammetric (CV) scans from 1.209 to 1.539 V vs. RHE in a 1 M KOH solution containing 0.18 mg·L$^{-1}$ of iron.

Figure 1:
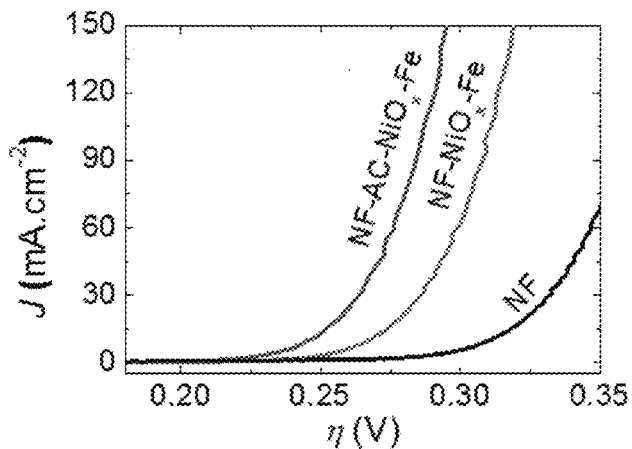
FIG. 1 shows polarization curves of NF, NF—NiO$_x$—Fe and NF-AC-NiO$_x$—Fe.

A layer of Fe-doped nickel oxide (NiO$_x$—Fe) was formed in this process. The obtained NF—NiO$_x$—Fe electrode exhibits much higher OER activity than NF electrode, as shown in FIG. 1.

Said NF—NiO$_x$—Fe electrode is different from previously known electrodes comprising nickel foam in that the nickel foam is oxidized and not only used as a supporting electrode. The oxidized nickel foam obtained here is a part of the active catalyst.

In this example, the cyclic voltammetry scans are used to oxidize the nickel foam and simultaneously incorporate iron.

EXAMPLE 2: ADDITIONAL STEP: CLEANING OF THE NICKEL FOAM WITH HYPOCHLORHYDRIC ACID

Figure 2A:
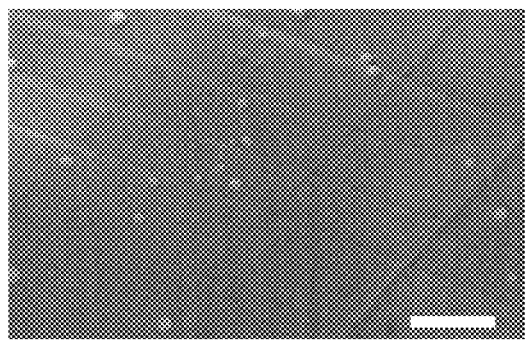
FIG. 2 represents scanning electron microscopy (SEM) images of the surfaces of NF (FIG. 2a), NF-AC (FIG. 2b), NF—NiO$_x$—Fe (FIG. 2c) and NF-AC-NiO$_x$—Fe (FIG. 2d) in which scale bars all correspond to 2 µm.
Figure 2B:
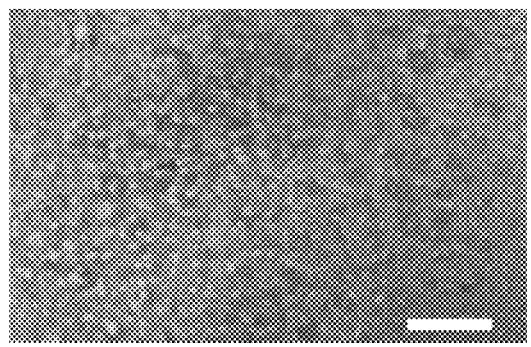

The as-received nickel foam electrodes have been washed with acetone under sonication conditions at a frequency of 20 kHz for 15 minutes. Then, in order to remove the nickel surface oxides formed by the air oxidation of nickel metal, the as-received NF was immersed into a solution containing 10 wt % hydrochloric acid (HCl) under sonication at a frequency of 20 kHz for 30 minutes. Surprisingly, the resulting nickel foam electrode, named "NF-AC" electrode, has a rougher surface than nickel foam electrode prepared without acid cleaning, as illustrated in the scanning electron microscopy images of FIGS. 2a and 2b.

Figure 2C:
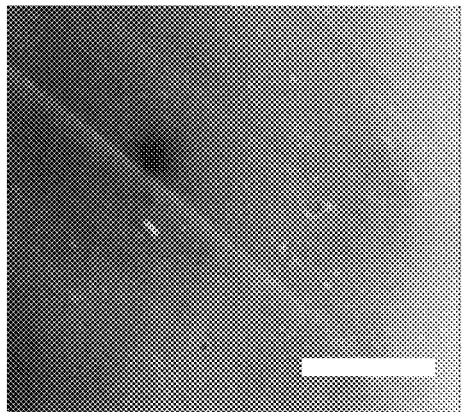
Figure 2D:
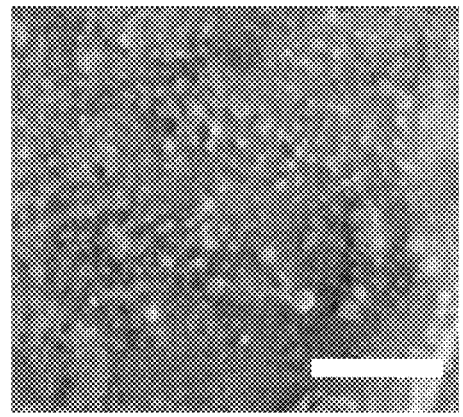

After 100 repetitive CV scans from 1.209 V to 1.539 V vs. RHE in a 1 M KOH solution containing iron (e.g., 0.18 mg·L$^{-1}$), the nickel foam was oxidized and iron has been incorporated in the nickel foam such that a NF-AC-NiO$_x$—Fe electrode was obtained (FIG. 2d). This electrode exhibits excellent OER activity, as shown in FIG. 1, and is rougher than NF—NiO$_x$—Fe electrode as obtained in example 1 (FIG. 2c).

To reach 10 mA·cm$^{-2}$, the inventors have shown that the NF-AC-NiO$_x$—Fe electrode requires an overpotential of 245 mV which is much lower than the overpotential required for NF—NiO$_x$—Fe (266 mV) and NF (311 mV). The respective Tafel slopes are 34, 36, and 45 for NF-AC-NiO$_x$—Fe, NF—NiO$_x$—Fe, and NF, respectively. A small Tafel slope is indicative of a better performance for the catalysis of OER. It is in particular indicative of a reduced overpotential.

Figure 3:
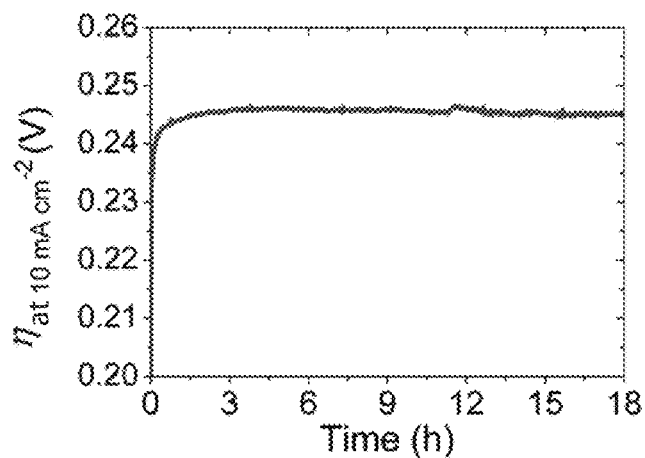
FIG. 3 illustrates chronopotentiometric measurements at 10 mA·cm$^{-2}$ for 18 hours using NF-AC-NiO$_x$—Fe as catalyst of OER.

The activity of the NF-AC-NiO$_x$—Fe electrode is stable: the overpotential for a current density of 10 mA·cm$^{-2}$ remained at 245 mV during an electrolysis of 18 hours, as shown in FIG. 3.

Inventors have noted that the acid cleaning improve the activation of nickel foam. The reason should be the formation of a rougher surface on the electrode which allows the deposition of more iron oxide (FeO$_x$) and the removal of surface nickel oxide (NiO$_x$) due to air oxidation in the as-received NF electrode which is not good for the electrodeposition of iron oxide.

Figure 4:
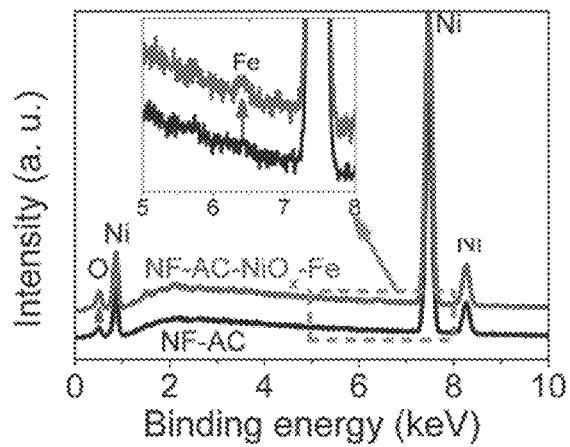
FIG. 4 shows Energy-Dispersive X-ray (EDX) spectra of NF-AC and NF-AC-NiO$_x$—Fe electrodes. The inset shows the magnified spectra of the rectangle region.

Energy-dispersive X-ray spectroscopy (EDX) indicated the presence of Fe ions in the NF-AC-NiO$_x$—Fe electrode but not in the NF-AC electrode, as shown in FIG. 4. The Fe loading in NF-AC-NiO$_x$—Fe electrode is in the order of 0.7-9.8 µg·cm$^{-2}$ depending on the preparation procedure.

The iron incorporation is essential to the high OER activity of NF-AC-NiO$_x$—Fe and NF—NiO$_x$—Fe electrodes.

NF-AC electrode has been subjected to 100 CV scans in a 1 M KOH solution which was stripped of Fe ions. The resulting Fe-free NF-AC-NiO$_x$ electrode exhibited a much lower OER activity. An overpotential of 343 mV was required to reach 10 mA cm$^{-2}$, and the Tafel slope was 69 mV dec$^{-1}$.

EXAMPLE 3: DIPPING INTO AN IRON DIPPING SOLUTION TO INCORPORATE IRON IN NF

A NF-AC electrode has been dipped into a FeCl$_3$ solution at 0.01 M for 15 minutes and then dried in an oven at 70° C. After this treatment, the color of the electrode has changed from metallic silvery white to dark yellow. The obtained electrode was denoted as NF-AC-Fe.

FIG. 5 shows that NF-AC-Fe electrode has much rougher surface than NF-AC (inset in FIG. 5).

Fe peaks were detected by EDX, indicating the presence of Fe ions on the surface of NF-AC-Fe.

FIGS. 6 and 7 reveal the formation of hierarchical nanoporous structures on the surface of NF-AC-Fe electrodes.

FIG. 8 shows that the coating layer is composed of ultra-small nanoparticles of 3-10 nm in size. Clear lattice fringes suggest the high crystallinity of these nanoparticles. Based on the inter-planar distances and angles, the nanoparticles include Ni (space group: Fm-3m, JCPDS No. 01-1258), NiO (space group: Fm-3m, JCPDS No. 01-1239), and Fe$_2$O$_3$ nanoparticles (space group: P4132-E, JCPDS No. 02-1047).

Elemental mapping analysis shows that Fe$_2$O$_3$ is mainly formed on the nanopores of Ni foam.

EXAMPLE 4: REPETITIVE CYCLIC VOLTAMMETRIC (CV) SCANS ON NF-AC-Fe ELECTRODE

The NF-AC-Fe electrode was activated by 100 repetitive cyclic voltammetric (CV) scans from 1.209 to 1.529 V vs. RHE in a 1 M KOH solution containing 0.18 mg·L$^{-1}$ of iron. FIG. 9 shows the obtained electrode, denoted as NF-AC-Fe—Ac. This electrode is still composed of tiny nanoparticles. However, elemental mapping analysis has been conducted and reveals that Fe was incorporated more homogeneously in NF-AC-Fe—Ac than in NF-AC-Fe, suggesting surface reconstruction during the activation.

EXAMPLE 5: COMPARISON OF CATALYTIC ACTIVITIES

FIG. 10 shows that, for OER catalysis, NF-AC-Fe—Ac electrode has a much better catalytic activity than NF-AC-NiO$_x$—Fe electrode, showing the interest of the step of dipping of NF-AC in FeCl$_3$ before subjecting it to repetitive CV scans.

The overpotential of NF-AC-Fe—Ac electrode for 10 mA·cm$^{-2}$ is only 212 mV, as presented in table 1 hereunder.

TABLE 1

Comparison of catalytic activities with reported Ni, Co, and NiFe based catalysts in 1M KOH.

| Catalysts | Electrodes | Overpotential η at 10 mA · cm$^{-2}$ (mV) | Overpotential η at 100 mA · cm$^{-2}$ (mV) | Overpotential η at 500 mA · cm$^{-2}$ (mV) | Tafel slope |
|---|---|---|---|---|---|
| NF—AC—Fe—Ac | Nickel foam | 212 | 247 | 283 | 35 |
| NF—AC—NiO$_x$—Fe | Nickel foam | 245 | 285 | 319 | 37 |
| Nickel foam | Nickel foam | 355 ± 35 | 515 ± 25 | / | 70-82 |
| NiO | Nickel foam | 345 | 398 | / | 53 |
| Co$_3$O$_4$ | Nickel foam | 328 | 430 | / | / |
| NiSe | Nickel foam | ~251 | 314 | / | 64 |
| NiFe LDH [a] | Nickel foam | 256 | 306 | / | 50 |
| NiFe hydroxides | Nickel foam | 245 | 280 | / | 28 |
| NiFe LDH/r-GO [b] | Nickel foam | 195 | 234 | / | 39 |
| Ni$_2$P—Ni | Nickel foam | 200 | 268 | 340 | 72 |
| Ni$_{60}$Fe$_{30}$Mn$_{10}$ | Self-supported | ~208 | 270 | 360 | 62 |
| EG/Co$_{0.85}$Se/NiFe LDH [c] | Graphite foil | ~203 | 260 | 297 | 57 |

[a] LDH: layered double hydroxides;
[b] r-GO: reduced graphene oxides;
[b] EG: exfoliated graphite.

High current densities of 100 mA·cm$^{-2}$ and 500 mA·cm$^{-2}$ were obtained at overpotentials of only 247 mV and 283 mV, respectively, with the NF-AC-Fe—Ac electrode. The current density reached 903 mA·cm$^{-2}$ at an overpotential n of 300 mV. Tafel slope was 35 mV·dec$^{-1}$, as shown in FIG. 11.

The catalytic activity of NF-AC-Fe—Ac electrode is much better than most of Ni, Co, and NiFe based catalysts grown or deposited on nickel foam, as shown in Table 1.

Data concerning NF-AC-Fe—Ac and NF-AC-NiO$_x$—Fe come from the work of the inventors and data for other compounds mentioned in Table 1 come from previously published studies.

Though some catalysts have been published to have the similar activity to NF-AC-Fe—Ac (NiFe LDH/r-GO, Ni$_2$P—Ni, Ni$_{60}$Fe$_{30}$Mn$_{10}$, EG/Co$_{0.85}$Se/NiFe LDH), the synthetic procedures are much more complicated, involving hydrothermal treatment, electrodeposition/oxidation, annealing at high temperature treatment, and their combination in most cases.

The stability of OER catalyzed by the NF-AC-Fe—Ac electrode was tested at a constant current density of 10 mA·cm$^{-2}$ for 10 hours and subsequent 100 mA·cm$^{-2}$ for 27 hours electrolysis. Results are presented in FIG. 12. It shows that the overpotential remained stable during the testing period at each current density.

The Faradaic efficiency for the OER catalyzed by NF-AC-Fe—Ac was determined by using a fluorescence O$_2$ detector.

Results are presented in FIG. 13. The Faradaic yield is quantitative during 4.2 hours of electrolysis.

In the Table 1 above, the overpotential required to reach a specific current density (eg. overpotential η at 10 mA cm$^{-2}$, 100 mA cm$^{-2}$ or 500 mA cm$^{-2}$) was used to evaluate the catalytic activity. The catalytic activity was dependent on the catalysts loading. That is to say at larger loading higher catalytic activity can be gotten.

In order to better describe the intrinsic catalytic activity of some materials, mass activity ($J_m$) and turnover frequency (TOF) were also applied. They both can be used to evaluate the catalytic activity of the catalyts regardless of the mass loading.

In the following experiment, three samples have been tested:

The first sample comprises a nickel foam electrode covered by NiFe layered double hydroxides (LDHs) as mentioned in the article «Three-dimensional NiFe layered double hydroxide film for high-efficiency oxygen evolution reaction; Zhiyi Lu et al.». This sample was synthesized by hydrothermal method at 120° C. for 12 h.

The second sample is a nickel foam electrode covered by NiFe hydroxides as described in the international patent application WO2016/023065. The NiFe hydroxides were electrodeposited on nickel foam or glassy carbon in potentiostatic mode at −1.0 V vs. Ag/AgCl.

The third sample is the nickel foam electrode incorporating iron, defined as NF-AC-NiOx-Fe, obtained in example 2 of the present application The mass activity was defined as the current per unit mass of the catalysts. It can be calculated from the equation:

$$J_m = \frac{J}{m} \quad 1)$$

where J is the current density at a given overpotential (e.g. η=300 mV), and m is the mass loading of the catalysts on the electrode.

The TOF value was defined as the number of O2 molecules that can be produced at each active site (metal atom) per second. It was calculated from the equation:

$$TOF = \frac{J \times A}{4 \times F \times n} \quad 2)$$

where J is the current density at a given overpotential (e.g. η=300 mV), A is the geometric surface area of the electrode, F is the Faraday constant (a value of 96485 C mol-1), and n is the number of moles of metal on the electrode.

To compare the intrinsic activity of the three aforementioned catalysts samples, the inventors have converted the current density J at 300 mV to mass activity $J_m$ and TOF based on the equations 1) and 2) above.

For the first and second samples, the current density J, the mass loading m, the geometric surface area A and the number of moles of metal n were obtained from the data respectively in the article «Three-dimensional NiFe layered double hydroxide film for high-efficiency oxygen evolution reaction; Zhiyi Lu et al.» and in the international patent application WO2016/023065. For the NF-AC-NiOx-Fe sample, all the related data come from the invention.

Using these data, the mass activity and TOFs were calculated according to equations 1) and 2). The loadings of these catalysts and the associated results for mass activity and TOF are shown in the table 2 below.

TABLE 2

| Samples | Loading (ug cm$^{-2}$) | Mass activity at 300 mV (A g$^{-1}$) | TOF at 300 mV (s$^{-1}$) |
|---|---|---|---|
| NF—AC—NiO$_x$—Fe | 0.7-9.8 | 23087 | 3.35 |
| NiFe LDH | 32 | 310 | 0.045 |
| NiFe hydroxides | 1000 | 52 | 0.0075 |

These results show that the NF-AC-NiOx-Fe sample has the better catalytic activity. It is obvious that at the same amount of Fe oxidized nickel foam incorporating Fe has much higher mass activity and TOF.

The good activity of the NF-AC-NiOx-Fe sample is due to the in situ formation of catalytic active sites under the OER conditions. NiOx is not a good OER catalyst, while the incorporation of Fe on NiOx dramatically improve the catalytic activity.

In case of oxidized nickel foam incorporating Fe, Fe in basic solution was grabbed by NiOx and simultaneously acted as active sites under the OER condition (activation by cyclic voltammetry scans). The O$_2$ bubbles produced on the active sites prevent the growth of Fe(Ni)Ox during the cyclic voltammetry scans, and thus lots of active Fe sites were exposed. This resulted in the extremely high catalytic activity at the same amount of Fe. It is different from the tested catalyst samples of NiFe LDH and NiFe hydroxides. Generally, NiFe LDH and NiFe hydroxides were not formed under OER condition. They were firstly grown to nanoparticles, and thus only the surface was active when they were applied for OER catalysis.

Hereunder is more information concerning the equipment, products and methods that have been used in examples 1 to 5.

Reagents and Materials

All the reagents in the experiment were analytical grade and used as received without further purification. Ni foam (with a thickness of 1.6 mm and 95% porosity) was purchased from Goodfellow Cambridge Ltd., UK. Hydrochloric acid (HCl) and potassium hydroxide (KOH) were purchased from Merck KGaA, Germany. The water used throughout all experiments was deionized water.

Structural Characterization

SEM images were taken in a Phillips (FEI) XLF-30 FEG scanning electron microscope. EDS-SEM spectra were taken from the spectrometer attached to a Phillips (FEI) XLF-30 FEG scanning electron microscope.

ICP-MS (Inductively Coupled Plasma—Mass Spectrometry) test has been used to measure the amount of iron. It was conducted on the Finnigan™ element2 high performance high resolution ICP-MS, which consists of a double focusing reverse geometry mass spectrometer. The sensitivity was better than $1.2 \times 10^5$ cps/ppb of $^{115}$In at a mass resolution of 4000, which corresponds to $1.2 \times 10^6$ cps/ppb at low resolution mode of 500. Measurement repeatability expressed in terms of RSD (Relative Standard Deviation) was better than 5%, depending on the element. The accuracy of the method was tested using certified riverine water reference materials SLRS-3. Accuracy was better than 5%. The detection limits obtained for trace metals in the medium resolution mode (R=4000) without the influence of signal interferences were in routine mode less than 0.2 ng·L$^{-1}$ for all elements. Calibration standards were prepared through successive dilutions in cleaned Teflon bottles, of 1 g·L$^{-1}$ ICP-MS stock solutions (Bernd Kraft). Suprapur® grade nitric acid (65% Merck) was used for the dilution of samples and for the preparation of standards (2+1000).

Ultrapure water was produced using Milli-Q° Ultrapure Water System (Millipore, Bedford, USA). The high resolution mode is also useful for samples having unexpected or unknown interferences, because the quantification is obtained by integrating only the area of the analyte peak, without the influence of an unexpected interference peak. Fe measurements were carried out at mass resolution of 4000 to avoid ArO interferences.

ICP-MS sample preparation: for the testing of Fe concentration in KOH, 1 M KOH solution (Merck KGaA) was neutralized by adding ultrapure mitric acid (65%, Merck KGaA). To test the concentration of Fe on the catalysts surface, an area of around 1.0 to 1.1 $cm^2$ of NF-AC-$NiO_x$—Fe electrode was dipped in ultrapure nitric acid (mixture of 0.25 mL ultrapure nitric acid (65%, Merck KGaA) and 5 mL $H_2O$) for 1-2 min and washed with distilled water twice. Dipping in nitric acid for long time led to same results. All the nitric acid and washing water were collected. Water was then added to reach the total volume of 10 mL. To make sure all the surface Fe was dissolved in nitric acid, the treated samples was checked by testing the OER activity in Fe free 1 M KOH. The OER activity is similar to the activity of NF-AC electrode in Fe free 1 M KOH, indicating the total dissolve of surface Fe. The loading examined in this method is also close to the value calculated from the Fe concentration change before and after 100 CV scans activation of NF-AC electrode in 1M KOH (60 mL). This confirmed the total dissolution of Fe on NF-AC-$NiO_x$—Fe electrode surface.

Electrochemical Measurements

Electrochemical characterizations including cyclic voltammetry (CV), linear sweep voltammetry (LSV) (corresponding to polarization curves), and chronopotentiometry were carried out on a Gamry Reference 3000 electrochemical instrument using a three-electrode electrochemical system.

1 M KOH solution was used as electrolyte, and an Ag/AgCl electrode with saturated KCl filling solution and Pt wire were used as reference and counter electrodes, respectively.

Nickel foams were used as work electrodes directly.

Hot glue was employed to fix the working area at 1.0-1.1 $cm^{-2}$. Before test, the reference electrode was measured against another unused Ag/AgCl reference electrode stored in saturated KCl solution.

Calibration of Ag/AgCl reference electrodes was done by measuring the RHE potential using a Pt electrode under a $H_2$ atmosphere.

During the test, Ag/AgCl reference electrode was constructed to a double-junction electrode to minimize contact between KOH and KCl.

CV scans were performed at a scan rate of 1 $mV·s^{-1}$, and the average of the two potentials at which the current crossed zero was taken to be the thermodynamic potential for the hydrogen electrode reaction. In 1 M KOH electrolytes, E vs. RHE=E vs. Ag/AgCl+1.009 V, and overpotential for OER was η=E vs. RHE −1.23 V=E vs. Ag/AgCl—0.221 V. Ohmic drop correction was performed using the current interrupt (CI) method by the potentiostat.

Before recording the catalytic activity, catalysts were activated by 5 linear sweeping voltammetry (LSV) followed by 100 cyclic voltammetry scans until reaching a stable state in 1M KOH (~30 mL). The LSV scans were recorded in the potential range 0.6-0.38 V vs Ag/AgCl at scan rate of 1 $mV·s^{-1}$. The cyclic voltammetry scans were recorded in the potential range 0.2-0.52/0.53 V vs Ag/AgCl at scan rate of 10 $mV·s^{-1}$. Following this, 2 cycles of backward LSVs were measured at a scan rate of 1 $mV·s^{-1}$ to record the catalytic activity.

Tafel slopes were calculated based on the LSV curves by plotting overpotential against log (current density).

Chronopotentiometric measurements were performed to evaluate the long-term stability. For the loading dependence analysis, the loadings were tuned by changing the cycling number of CV scans or only applying 1-5 LSVs.

The invention claimed is:

1. A method of synthesis of an oxidized nickel foam electrode incorporating iron comprising the step of subjecting a nickel foam electrode to repetitive cyclic voltammetric scans in a basic solution containing iron.

2. The method according to claim 1 comprising the step of:
washing said nickel foam electrode in an acid solution,
prior to said step of subjecting said nickel foam electrode to repetitive cyclic voltammetric scans in a basic solution containing iron.

3. The method according to claim 1 comprising the step of:
dipping said nickel foam electrode into an iron dipping solution,
prior to said step of subjecting said nickel foam electrode to repetitive cyclic voltammetric scans in a basic solution containing iron.

4. The method according to claim 1 comprising the successive steps of:
washing a nickel foam electrode in an acid solution, said acid solution, and
dipping said nickel foam electrode into an iron dipping solution,
prior to said step of subjecting said nickel foam electrode to repetitive cyclic voltammetric scans in a basic solution containing iron.

5. The method according to claim 1, wherein the repetitive cyclic voltammetric scans are performed from a first value "a" comprised between 1.15 V and 1.25 V to a second value "b" comprised between 1.49 V to 1.59 V versus Reversible Hydrogen Electrode at a scan rate comprised between 8 $mV·s^{-1}$ and 12 $mV·s^{-1}$.

6. The method according to claim 5 wherein "a" is around 1.209, "b" is around 1.539V, and wherein the scan rate is around 10 $mV·s^{-1}$.

7. The method according to claim 1, wherein said basic solution containing iron comprises at least 0.08 $mg·L^{-1}$ of iron.

8. The method according to claim 1, wherein said basic solution is a solution of KOH or of NaOH at a concentration between 0.5 M and 10 M.

9. The method according to claim 1, wherein the cyclic voltammetric scans are carried out at least 30 times.

10. The method according to claim 2 wherein said acid solution comprises HCl at a concentration of 5% to 10% or $H_2SO_4$ at a concentration of 2% to 5%.

11. The method according to claim 3, wherein Fe(II) and/or Fe(III) of said iron dipping solution are chosen among $FeCl_2$ and $FeCl_3$.

12. The method of claim 1, wherein the acid solution comprises HCl or $H_2SO_4$.

13. The method of claim 3, wherein the step of dipping the nickel foam electrode into the iron dipping solution is performed for at least 10 minutes.

14. The method of claim 13, wherein said iron dipping solution comprises between 0.005 M and 0.2 M Fe(II) and/or Fe(III).

\* \* \* \* \*